United States Patent [19]

Hottovy et al.

[11] Patent Number: 5,565,175
[45] Date of Patent: Oct. 15, 1996

[54] APPARATUS AND METHOD FOR PRODUCING ETHYLENE POLYMER

[75] Inventors: John D. Hottovy; Frederick C. Lawrence; Barry W. Lowe; James S. Fangmeier, all of Bartlesville, Okla.

[73] Assignee: Phillips Petroleum Company, Bartlesville, Okla.

[21] Appl. No.: 590,995

[22] Filed: Oct. 1, 1990

[51] Int. Cl.⁶ ..................... C08F 2/00
[52] U.S. Cl. ............ 422/132; 422/241; 422/134
[58] Field of Search ................... 422/132, 240, 422/241, 134; 202/267.1; 526/64

[56] References Cited

U.S. PATENT DOCUMENTS

| | | | |
|---|---|---|---|
| 3,248,179 | 4/1966 | Norwood | 23/285 |
| 3,374,211 | 3/1968 | Marwil et al. | 260/88.2 |
| 4,601,322 | 7/1986 | Khare | 164/418 |
| 4,668,473 | 5/1987 | Agarwal | 422/132 |

OTHER PUBLICATIONS

Perry, John H., ed. *Chemical Engineers' Handbook*, third ed., New York, Mc–Graw–Hill Book Company, 1950, pp. 1256–1258.

Primary Examiner—Lyle A. Alexander
Attorney, Agent, or Firm—George E. Bogatie

[57] ABSTRACT

An apparatus and method for producing ethylene polymer are provided which employ a conduit in the form of a closed loop (i.e. loop reactor) for receiving a flow of a monomer which includes ethylene, a polymerization catalyst and a diluent therethrough for the polymerization of the monomer to ethylene polymer. The conduit comprises at least one pipe constructed of rolled plate around which coolant fluid passes in heat exchange relationship.

33 Claims, 2 Drawing Sheets

APPARATUS AND METHOD FOR PRODUCING ETHYLENE POLYMER

BACKGROUND OF THE INVENTION

This invention relates to an apparatus and method for producing ethylene polymer in a loop reactor which is defined by a conduit in the form of a closed loop.

Olefin polymers, such as polyethylene, are typically produced by circulating monomer, catalyst and diluent in admixture through a loop reactor. The polymerization reaction is an exothermic reaction which generates considerable heat. Consequently, in order to maintain the reaction temperature at a desired level, a coolant fluid such as water is preferably circulated around and in contact with the exterior surface of certain pipe sections of the loop reactor.

It is particularly desirable to optimize the removal of heat from the reactor contents to either maximize the polymer production rate at a specific reaction temperature or minimize the reaction temperature at a specific polymer production rate so as to enable the production of polymers with lower densities.

SUMMARY OF THE INVENTION

It is, therefore, an object of the invention to provide an apparatus and method for producing ethylene polymer in a loop reactor which is an improvement over the prior art with respect to removal of heat from the reactor contents.

The above object is realized by an apparatus for producing ethylene polymer which comprises: a conduit means for defining a flow passageway therethrough so as to form a closed loop, wherein at least a portion of the conduit means comprises at least one pipe constructed of rolled plate which has two edges joined along a seam; a cooling means for passing a flow of coolant fluid in heat exchange relationship with the exterior surface of the pipe(s); a means for introducing at least one monomer which includes ethylene into the passageway; a means for introducing a polymerization catalyst and diluent into the passageway; a means for establishing a flow of the monomer(s), catalyst and diluent in admixture through the passageway and around the closed loop, whereby the ethylene polymer is produced in the passageway; and a means for withdrawing polymer from the passageway.

According to another aspect of the invention, there is provided a method of producing ethylene polymer which employs the apparatus as described above and wherein coolant fluid flows in heat exchange relationship with the exterior surface of the pipe(s) while the contents thereof flow through the passageway as defined within the conduit means.

As will be discussed in more detail below, employing the rolled plate construction for the above-mentioned pipe(s) enables use of a thinner pipe wall as compared to prior art pipes of a seamless construction, as will be demonstrated in a subsequent example. Minimizing thickness of the wall in this regard increases its heat transfer coefficient, thereby enabling increased removal of heat from the reactor contents. As mentioned above, such enhanced heat removal capability serves to either maximize production rate of polymer at a specific reaction temperature or minimize the reaction temperature at a specific production rate so as to enable production of polymers with lower densities.

DETAILED DESCRIPTION OF THE INVENTION

The present invention is generally applicable to the production of ethylene polymer by flowing at least one monomer which includes ethylene, a catalyst and a diluent in admixture through a loop reactor.

The monomer feed can comprise ethylene, alone, or in admixture with a minor proportion (less than about 25 weight percent of the total monomer feed) of another olefin. Such other olefin can be a 1-olefin of 3 to 8 carbon atoms per molecule, such as propylene, 1-butene, 1-pentene, 1-hexene, 1-octene, 4-methyl-1-pentene, 4-ethyl-1-hexene, and the like, or a conjugated diolefin such as butadiene or isoprene.

The catalyst can be any suitable catalyst for polymerizing the monomers discussed above, and is most preferably a chromium oxide catalyst containing hexavalent chromium.

The diluent can be, for example, a hydrocarbon such as normal pentane, normal butane, isobutane, normal hexane, normal decane, cyclohexane, methylcyclopentane, methylcyclohexane, and the like.

The ethylene polymer produced is in particle form, and can be according to certain aspects of the invention either a homopolymer of ethylene or a copolymer of ethylene and another olefin mentioned above. As used herein and in the appended claims, the terms "polymer of ethylene" and "ethylene polymer" include both homopolymers of ethylene, produced from ethylene monomer only, and copolymers of ethylene and another olefin, produced from ethylene and another olefin as described above.

Figure 1:
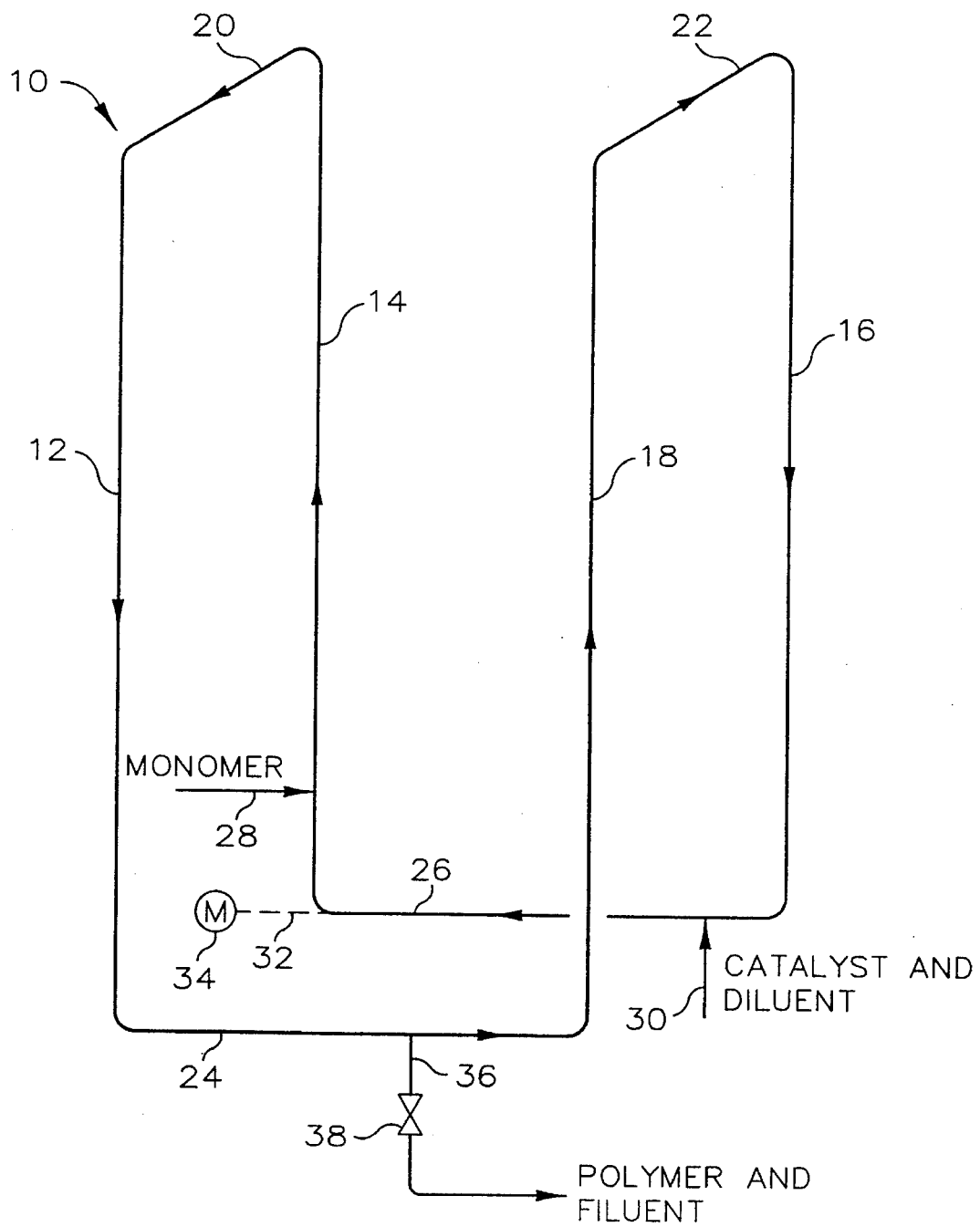
FIG. 1 is a schematic and isometric representation of an apparatus for producing ethylene polymer.

Referring now to FIG. 1, a loop reactor is schematically indicated at 10. The illustrated closed loop schematically represents the passageway defined by a conduit means which includes a plurality of generally vertically oriented sections 12, 14, 16 and 18, and also a plurality of generally horizontally oriented sections 20, 22, 24 and 26. As shown, sections 12 and 14 are connected at their upper ends by section 20, and sections 16 and 18 are similarly connected at their upper ends by section 22. Sections 14 and 16 are connected at their lower ends by section 26, and sections 12 and 18 are similarly connected at their lower ends by section 24. Each of the various sections are defined by pipes which will be further discussed with respect to FIG. 2.

It should be understood that the configuration of the loop reactor 10 as illustrated in FIG. 1 is only one possible embodiment, and could take other configurations and shapes providing the various interconnected sections define a closed loop.

As shown, monomer feed in liquid form is introduced into section 14 of the illustrated embodiment as indicated at 28, whereas a slurry of solid particulate catalyst and liquid diluent is introduced into section 26 as indicated at 30. Although catalyst and diluent is illustrated as being introduced into section 26 at only one injection point, there are preferably several (i.e. 3 to 10) such injection points in a commercial reactor.

A flow of the reactor contents is established in a predetermined direction, such as that direction indicated by the arrows, by means of an internal propeller or similar means (not shown) driven by a drive link 32 connected to a suitable motive source 34. The flow of the reaction mixture is preferably maintained at a sufficient velocity to maintain the solids in suspension. Fluid flow in terms of the Reynolds number is preferably in the range of about 1,000,000 to about 35,000,000.

With respect to other process conditions, the temperature of the contents of the loop reactor is generally maintained in the range of about 150° F. to about 250° F. The pressure is generally maintained in the range of about 450 to about 800 psig (gauge fluid pressure, as measured with respect to atmospheric pressure).

Ethylene polymer is accordingly produced in the loop reactor 10 which is withdrawn by means of settling leg 36 and valve 38. As the reactor contents flow through section 24, polymer tends to settle into settling leg 36 upstream from valve 38 in its closed position. Valve 38 is periodically opened by a suitable control means (not shown) to allow discharge of a very dense slurry of polymer and diluent. Assuming the various pipes defining the reactor passageway to have an outside diameter of about 10 inches to about 30 inches and a nominal wall thickness of about ½ inch to about ¾ inch, polymer production rates are generally in the range of about 30,000 lbs/hr to about 50,000 lbs/hr. Polymer density can range from about 0.89 to about 0.97, depending upon the reaction temperature, the monomers employed and the monomer feed rate. Generally speaking, a decrease in the reaction temperature at a constant monomer feed rate results in a polymer with a lower density.

Figure 2:
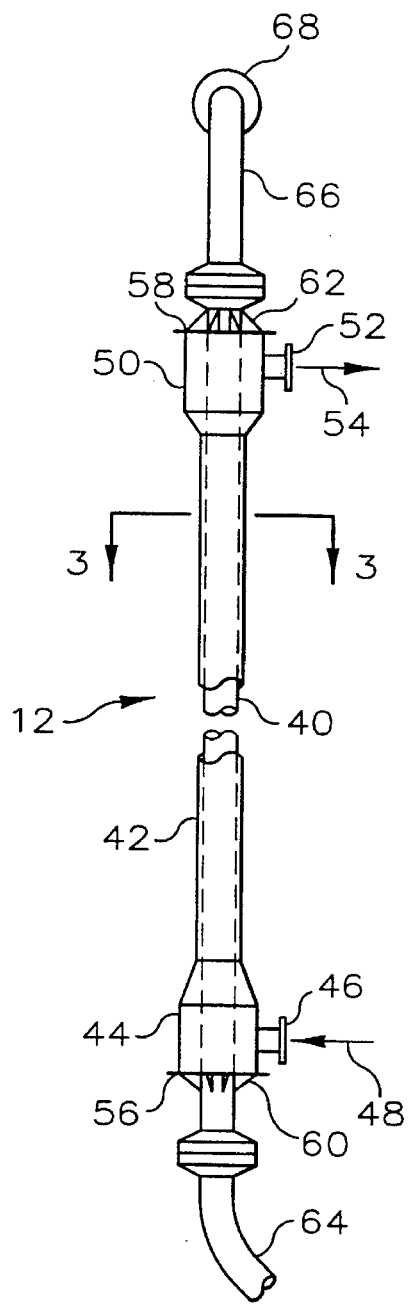
FIG. 2 is a side view of one section of the apparatus of FIG. 1.

Referring now to FIG. 2, section 12 of the loop reactor is shown, wherein a middle portion of the section is broken away for illustrative purposes. Section 12 includes pipe 40, which receives the flow of monomer, diluent, catalyst and polymer therethrough and which extends through pipe 42 so as to be generally coaxial therewith. The lower end of pipe 42 is connected to an enlarged portion 44 which has a coolant fluid inlet 46 through which a flow of coolant fluid, such as water, is admitted as indicated at 48. The upper end of pipe 42 is similarly connected to an enlarged portion 50 having an outlet 52 through which coolant fluid exits as indicated at 54. Accordingly, coolant fluid is caused to flow in the generally annular space defined between pipes 40 and 42 so as to flow around and in contact with the exterior surface of pipe 40. Heat exchange through the wall of pipe 40 between the coolant fluid and the contents of pipe 40 results in removal of heat from the contents of pipe 40.

Enlarged portions 44 and 50 have associated therewith end rings 56 and 58, respectively, through which pipe 40 extends. To further stabilize pipe 40, brace members 60 and 62 are provided to connect rings 56 and 58, respectively, to pipe 40. Finally, the lower and upper ends of pipe 40 are connected to respective elbows 64 and 66 through corresponding flange assemblies. Elbow 64 extends to section 24 (FIG. 1) and elbow 66 extends to section 20 (FIG. 1). A flange 68 is visible in FIG. 2 which is intermediately located along generally horizontally oriented section 20, which is not visible in FIG. 2.

Figure 3:
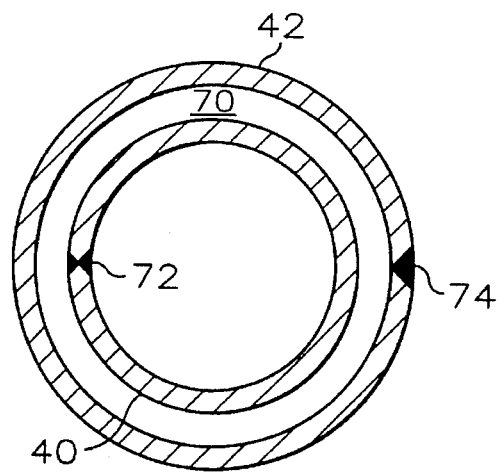
FIG. 3 is a cross-sectional view of the section of FIG. 2 as viewed along line 3—3 which shows the rolled plate construction of pipes in accordance with the invention.

Referring now to FIG. 3, a cross-sectional view of pipes 40 and 42 is shown, as well as generally annular space 70 defined between the exterior surface of pipe 40 and the interior surface of pipe 42.

Pipe 40 is constructed of rolled plate which has two edges joined along a longitudinally extending seam 72. Pipe 40 is produced using known and conventional processes wherein a plate is rolled to the desired tubular shape. Edges of the rolled plate are preferably joined together by any suitable welding technique, such as electric-arc welding, to produce a welded seam. Most preferably, the filler metal used to make the weld is metallurgically compatible with and equivalent in tensile strength to that of the rolled plate, and also preferably extends from the exterior surface of pipe 40 to the interior surface of pipe 40 so as to constitute a "complete" butt joint. Such a "complete" butt Joint can be in the form of, for example, a double-welded butt joint which is subjected to a full radiographic examination. This provides a joint efficiency (ratio of the allowable stress in the weld to allowable stress for the rolled plate) of 100%, which is in accordance with ASME Pressure Vessel Code Section VIII, Div. 1.

The rolled plate of pipe 40 preferably comprises a steel having a thermal conductivity of at least about 20 Btu/(hr)(°F.)(ft) and a minimum tensile strength of at least about 50,000 psi. By way of example, some specific carbon and low-alloy steels having such properties and suitable for use in the invention are set forth in Table I, along with their associated thermal conductivities and minimum tensile strength.

TABLE I

| Steel | Thermal Conductivity (Btu/(hr) (°F.) (ft) | Minimum Tensile Strength (psi) |
|---|---|---|
| A516 Gr 70 | 27.8 | 70,000 |
| A537 Cl 2 | 26.8 | 80,000 |
| A202 Gr B | 23.9 | 85,000 |
| A285 Gr C | 30.1 | 55,000 |
| A514 Gr B | 27.4 | 110,000 |
| A515 Gr 70 | 27.2 | 70,000 |
| A517 Gr A | 24.1 | 115,000 |
| A517 Gr B | 27.5 | 115,000 |
| A533 Ty A Cl 3 | 27.6 | 100,000 |
| A542 Ty A Cl 2 | 21.5 | 115,000 |
| A678 Gr C | 25.7 | 95,000 |

Thermal conductivities in Table I were calculated for each steel in the manner discussed in detail in a subsequent example, and correspond to a temperature range of about 134° F. to about 233° F. All thermal conductivities given herein and in the appended claims will be understood to correspond to such a temperature range. The minimum tensile strengths are taken from "Lukens 1988–89 Plate Steel Specification Guide," Lukens Steel Company, Coatesville, Pa., 1988. It is noted that in order for a loop reactor to be ASME Code stamped, the steel employed should be one which is listed in Table UCS-23 of the ASME Pressure Vessel Code.

With respect to the composition of the steel employed for the rolled plate of pipe 40, it is preferred that the steel is characterized by less than about 0.5 weight percent carbon, less than about 1.5 weight percent manganese, less than about 1.0 weight percent silicon, less than about 2.5 weight percent chromium, and less than about 1.0 weight percent nickel. Each of the steels listed in Table I has such compositional characteristics. It has been found that each of the above-mentioned elements generally lessens the thermal conductivity of the steel. Conversely, it has also been found that cobalt, molybdenum, copper, sulfur, and phosphorus in a steel increases its thermal conductivity.

A particularly preferred balance of thermal conductivity, minimum tensile strength, weldability and cost can be realized in steels having a thermal conductivity of about 25 to about 30 Btu/(hr)(°F.)(ft) and a minimum tensile strength of about 60,000 to about 90,000 psi, and further characterized by the above-mentioned compositional limits of carbon, manganese and silicon, less than about 0.25 weight percent chromium and less than about 0.25 weight percent nickel. Of the steels listed in Table I, A516 Gr 70 is a particularly preferred steel which meets these criteria.

With respect to dimensions of pipe 40, where the pipe 40 has an outside diameter of about 10 inches to about 30 inches, the rolled plate of such pipe preferably has a nominal wall thickness of about ½ inch to about ¾ inch, assuming typical ethylene polymerization process conditions, and an associated mill tolerance which is the smaller of 0.01 inch (dimensional variation) or 6% (fractional variation) according to the ASME Pressure Vessel Code Section VIII, Div. 1. Such mill tolerance for rolled plate is sufficiently small that it can be assumed to be zero according to the ASME Code for the purpose of calculating design thickness (minimum permissible thickness). As used herein and in the appended claims, "nominal thickness" is the wall thickness of the rolled plate which the manufacturing process is designed to produce. Also as used herein and in the appended claims, "mill tolerance" is the maximum variation in actual wall thickness as compared to the nominal thickness. The term "design thickness", as will be discussed further in a subsequent example, is the thickness value which is calculated to be required for a certain predetermined design pressure.

Pipe 42 can also be of a rolled plate construction, having a longitudinal, welded seam 74 as is shown in FIG. 3. For the sake of manufacturing convenience, pipe 42 can be fabricated from the same material as pipe 40.

Pipes defining horizontally oriented sections 20, 22, 24 and 26 (FIG. 1) can be of a seamless construction rather than a rolled plate construction. Such a seamless construction requires a greater design thickness than with the rolled plate construction due to large mill tolerances, as will be more apparent from the example discussed below. However, in the horizontally oriented sections which do not have cooling jackets associated therewith, greater design thickness and associated lower heat transfer coefficient is a less important consideration.

A calculated example will now be described to further illustrate the invention and to show the advantages thereof over a prior art loop reactor which employs seamless pipe. This example should not be construed to limit the invention in any manner.

The design thickness of the wall of a cylindrical reactor pipe is given by the following equation:

$$t = \frac{P(R + C_i)/(SE - .6P)}{1 - M} + C \quad (1)$$

where t is the design thickness in inches, P is the design pressure (internal) in psia (absolute fluid pressure, as measured with respect to zero pressure), R is the inside radius of the pipe in inches, S is the allowable stress in psi, E is the joint efficiency factor which is unitless, $C_i$ is the inner corrosion allowance in inches for the interior surface of the pipe, C is the total corrosion allowance in inches (the sum of the inner corrosion allowance $C_i$ and the outer corrosion allowance $C_o$, where $C_o$ is the corrosion allowance for the exterior surface of the pipe), and M is the mill tolerance which in this equation is a fraction and unitless.

Table II sets forth assumed values for the variables of equation (1) and the calculated value for t with respect to a prior art reactor pipe of A106 Gr B steel having a seamless construction (denoted as "Prior Art") and a reactor pipe of A516 Gr 70 steel having a rolled and welded plate construction in accordance with the invention (denoted as "Invention"). Also indicated in Table II is the nearest available plate or seamless pipe nominal thickness $t_n$ above the design thickness t.

TABLE II

| Pipe Type | P (psia) | R (in) | S (psi) | E (unitless) | M (unitless) | $C_i$ (in) | C (in) | t (in) | $t_n$ (in) |
|---|---|---|---|---|---|---|---|---|---|
| Prior Art (Seamless) | 906 | 11.0313 (11 ¹/₃₂) | 15,000 | 1 | 0.125 | 0.0625 (¹/₁₆) | 0.0938 (³/₃₂) | 0.8884 | 0.9690 (³¹/₃₂) |
| Invention (Rolled Plate) | 906 | 11.0313 (11 ¹/₃₂) | 17,500 | 1 | 0.000 | 0.0625 (¹/₁₆) | 0.0938 (³/₃₂) | 0.6866 | 0.6875 (¹¹/₁₆) |

In each case, the design pressure P is assumed to be substantially above the maximum operating pressure for an ethylene polymerization reactor and takes into account hydrostatic and pump differential pressure. The allowable stress S is assumed to be ¼ the minimum tensile strength for each type of steel. Joint efficiency E for the seamless pipe is of course assumed to be 1 (or 100%) since there is no joint, and E for the rolled plate pipe is assumed to be 1 (100%) based on a complete butt weld subjected to a full radiographic examination. Mill tolerance M of 0.125 (12.5%) for the seamless pipe is in accordance with the ASME Pressure Vessel Code Section VIII, Div. 1. This large mill tolerance for the seamless pipe is due to the manufacturing process for making such seamless pipe such as by extrusion, for example. Rolled plate pipe is manufactured from a flat rectangular plate which can be fabricated with very little variation in thickness, whereby the mill tolerance for the rolled plate pipe can be assumed to be zero in accordance with the ASME Pressure Vessel Code as previously discussed. The total corrosion allowance C in each case was derived by allowing ¹/₃₂ inch loss of thickness on the outside ($C_o$=¹/₃₂ inch), ¹/₃₂ inch loss of thickness on the inside due to corrosion and an additional ¹/₃₂ inch loss of thickness on the inside due to periodic cleaning ($C_i$ =¹/₁₆ inch) to give a total of ³/₃₂ inch (0.0938 inch).

The design thickness t of the seamless pipe can be seen from Table II to be considerably greater than the design thickness of the rolled plate pipe, thus resulting in a nominal thickness $t_n$ which is also greater than the nominal thickness of the rolled plate pipe. Although a portion of the difference in design thickness is due to the difference in allowable stress values, most of this difference is due to the seamless pipe's large mill tolerance value.

The following expression is a close approximation of the heat transfer coefficient for the reactor pipe wall, assuming the diameter of the pipe is large as compared to its thickness, as is the case in this specific example:

$$h_r = \frac{K}{t_n} \quad (2)$$

where $h_r$ is the heat transfer coefficient for the reactor pipe wall in Btu/(hr)(ft²)(°F.), K is the thermal conductivity of the reactor pipe wall in Btu/(hr)(ft)(°F.), and $t_n$ is the nominal thickness for the reactor pipe wall in feet.

In order to calculate $h_r$ for each type of reactor pipe discussed above, it was necessary to accurately determine thermal conductivity K. This was done by deriving an equation for K which is a function of the composition of the particular steel employed:

$$K = f(C, Mn, Cr, Ni, Si, CoMo, PS), \quad (3)$$

where C is the carbon weight percentage, Mn is the manganese weight percentage, Cr is the chromium weight percentage, Ni is the nickel weight percentage, Si is the silicon weight percentage, CoMo is the sum of the cobalt and molybdenum weight percentages, and PS is the sum of the phosphorus and sulfur weight percentages.

A total of 71 data points were taken from Boyer, H. E. and Gall, T. L., eds., *ASM Metals Handbook*, American Society for Metals, Metals Park, Ohio, 1984 and Touloukian, Y. S. et al., "Thermal Conductivity-Metallic Elements and Alloys," Vol. 1 of *Thermophysical Properties of Matter*, IFI/Plenum, 1970, wherein each data point included a thermal conductivity value in Watts/(cm)(°K) and weight percentage values for each of C, Mn, Cr, Ni, Si, CoMo and PS. The data points taken were primarily for carbon and low-alloy steels, and excluded any steels quenched or made with low temperature annealing. In addition, all thermal conductivity values for the data points were for temperatures between 134° F. (330° K.) and 233° F. (385° K.). An equation was fitted to the data points and a conversion factor of 57.7789 applied thereto to convert from Watts/(cm)(°K) to Btu/(hr)(ft)(°F.). The resulting equation is as follows:

$$K = 57.7789(-0.184145C + 0.103058C^2 - 0.090918Mn + 0.004656Mn^2 - 0.019635C/Mn - 0.080988Cr - 0.040108Ni + 0.029689CoMo + 0.083686CuC/Mn - 0.118106Si + 0.136711PS + 0.640509), \quad (4)$$

where K is in Btu/(hr)(ft)(°F.).

Thermal conductivity K values were calculated from equation (4) for each of the types of reactor pipe (A106 Gr B and A516 Gr 70) discussed above by employing compositional weight percentage values from Lukens (supra). An average weight percentage value was used if a range was given in Lukens, and a value of 75% of the maximum was used if a maximum value was given. The calculated K values and nominal thickness $t_n$ values for each type of reactor pipe were then employed in equation (2) to obtain the heat transfer coefficient values $h_r$. The K, $t_n$ and $h_r$ values for each type of reactor pipe are set forth in Table III.

TABLE III

| Pipe Type | K (Btu/(hr)(ft)(°F.)) | $t_n$ ft | $h_r$ (Btu/(hr)(ft$^2$)(°F.)) |
|---|---|---|---|
| Prior Art (Seamless) | 28.7 | 0.9690/12 | 355 |
| Invention (Rolled Plate) | 27.8 | 0.6875/12 | 485 |

It can be seen from Table III that although the seamless reactor pipe has a slightly higher thermal conductivity than the rolled plate reactor pipe, the rolled plate reactor pipe has a considerably greater (nearly 37%) heat transfer coefficient. This greater heat transfer coefficient $h_r$, as applied to heat transfer calculations in conjunction with a slurry film heat transfer coefficient for the reactor contents of about 500 Btu/(hr)(ft$^2$)(°F.) and a coolant (water) film heat transfer coefficient of about 950 Btu/(hr)(ft$^2$)(°F.), translates to an estimated 12.8 percent increase in polymer production rate at a reaction temperature of 218° F., or an estimated 6.6° F. decrease in reaction temperature at a production rate of 38,270 lbs/hr in accordance with the invention, assuming the production of an ethylene-hexene copolymer (less than 1 weight percent hexene) having a density of 0.955 g/cc with the following process conditions: reactor pressure of about 636 psig; a velocity of the reactor contents of 27.3 ft/sec; a water coolant velocity of 8.8 ft/sec; a water coolant inlet temperature of 158° F.; and reactor contents having a 62 volume percent solids content in an isobutane diluent.

Obviously many modifications and variations of the present invention are possible in light of the above teachings. It is therefore to be understood that within the scope of the appended claims the invention may be practiced otherwise than as specifically described.

That which is claimed is:

1. An apparatus for producing ethylene polymer which comprises:

a conduit means for defining a flow passageway therethrough so as to form a closed loop, wherein at least a portion of said conduit means comprises at least one pipe, having an exterior surface, constructed of rolled plate which has two edges joined along a seam;

a cooling means for passing a flow of coolant fluid in heat exchange relationship with the exterior surface of said at least one pipe;

a means for introducing at least one monomer which includes ethylene into said passageway;

a means for introducing a polymerization catalyst and diluent into said passageway;

a means for establishing a flow of said at least one monomer, catalyst and diluent in admixture through said passageway and around said closed loop, whereby said ethylene polymer is produced in said passageway; and a means for withdrawing polymer from said passageway.

2. An apparatus for producing ethylene polymer which comprises:

a conduit means for defining a flow passageway therethrough so as to form a closed loop, wherein at least a portion of said conduit means comprises at least one pipe, having an exterior surface, constructed of rolled plate which has two edges joined along a seam, and wherein said rolled plate comprises a steel which comprises less than about 0.5 weight percent carbon, less than about 1.5 weight percent manganese, less than about 1.0 weight percent silicon, less than about 2.5 weight percent chromium, and less than about 1.0 weight percent nickel;

a cooling means for passing a flow of coolant fluid in heat exchange relationship with the exterior surface of said at least one pipe;

a means for introducing at least one monomer which includes ethylene into said passageway;

a means for introducing a polymerization catalyst and diluent into said passageway;

a means for establishing a flow of said at least one monomer, catalyst and diluent in admixture through said passageway and around said closed loop, whereby said ethylene polymer is produced in said passageway; and a means for withdrawing polymer from said passageway.

3. An apparatus as recited in claim 2 wherein said cooling means comprises: at least one pipe generally coaxially positioned with respect to and surrounding said at least one pipe of said conduit means so as to define a generally annular space therebetween; and a means for passing said coolant fluid through said annular space so as flow around and in contact with the exterior surface of said at least one pipe of said conduit means.

4. An apparatus as recited in claim 3 wherein said at least one pipe of said cooling means is also constructed of rolled plate.

5. An apparatus as recited in claim 2 wherein said edges of said rolled plate are joined along said seam by a weld.

6. An apparatus as recited in claim 5 wherein said seam extends generally longitudinally along said at least one pipe.

7. An apparatus as recited in claim 6 wherein said at least one pipe has an outside diameter of about 10 inches to about 30 inches.

8. An apparatus as recited in claim 7 wherein said rolled plate of said at least one pipe has a nominal wall thickness of about ½ inch to about ¾ inch.

9. An apparatus as recited in claim 2 wherein said at least one pipe of said conduit means is generally vertically oriented.

10. An apparatus as recited in claim 9 wherein said at least one pipe of said conduit means comprises a plurality of generally vertically oriented pipes.

11. An apparatus as recited in claim 10 wherein said conduit means further comprises a plurality of generally horizontally oriented pipes.

12. An apparatus as recited in claim 11 wherein said horizontally oriented pipes are of a seamless construction.

13. An apparatus as recited in claim 2 wherein said steel has a thermal conductivity of at least about 20 Btu/(hr)(°F.)(ft) and a minimum tensile strength of at least about 50,000 psi.

14. An apparatus as recited in claim 13 wherein said steel is selected from the group consisting of A516 Gr 70, A537 Cl 2, A202 Gr B, A285 Gr C, A514 Gr B, A515 Gr 70, A517 Gr A, A517 Gr B, A533 Ty A Cl 3, A542 Ty A Cl 2 and A678 Gr C.

15. An apparatus as recited in claim 13 wherein said steel has a thermal conductivity of about 25 to about 30 Btu/(hr)(°F.)(ft) and a minimum tensile strength of about 60,000 to about 90,000 psi.

16. An apparatus as recited in claim 15 wherein said steel comprises less than about 0.25 weight percent chromium and less than about 0.25 weight percent nickel.

17. An apparatus as recited in claim 16 wherein said steel is A516 Gr 70.

18. A method of producing ethylene polymer which comprises:
(a) providing a conduit means which defines a flow passageway therethrough so as to form a closed loop, wherein at least a portion of said conduit means comprises at least one pipe, having an exterior surface, constructed of rolled plate which has two edges joined along a seam;
(b) introducing at least one monomer which includes ethylene into said passageway;
(c) introducing a polymerization catalyst and diluent into said passageway;
(d) establishing a flow of said at least one monomer, said catalyst and said diluent in admixture through said passageway and around said closed loop to thereby produce ethylene polymer in said passageway;
(e) passing a flow of coolant fluid, during step (d), in heat exchange relationship with the exterior surface of said at least one pipe of said conduit means; and
(f) withdrawing polymer from said passageway.

19. A method of producing ethylene polymer which comprises:
(a) providing a conduit means which defines a flow passageway therethrough so as to form a closed loop, wherein at least a portion of said conduit means comprises at least one pipe, having an exterior surface, constructed of rolled plate which has two edges joined along a seam, and wherein said rolled plate comprises a steel which comprises less than about 0.5 weight percent carbon, less than about 1.5 weight percent manganese, less than about 1.0 weight percent silicon, less than about 2.5 weight percent chromium, and less than about 1.0 weight percent nickel;
(b) introducing at least one monomer which includes ethylene into said passageway;
(c) introducing a polymerization catalyst and diluent into said passageway;
(d) establishing a flow of said at least one monomer, said catalyst and said diluent in admixture through said passageway and around said closed loop to thereby produce ethylene polymer in said passageway;
(e) passing a flow of coolant fluid, during step (d), in heat exchange relationship with the exterior surface of said at least one pipe of said conduit means; and
(g) withdrawing polymer from said passageway.

20. A method as recited in claim 19 wherein said at least one monomer consists essentially of ethylene.

21. A method as recited in claim 19 wherein said at least one monomer comprises ethylene and another olefin in the amount of less than about 25 weight percent.

22. A method as recited in claim 19 wherein the contents of said at least one pipe in step (d) are at a temperature of about 150° F. to about 250° F.

23. A method as recited in claim 22 wherein the contents of said at least one pipe in step (d) are at a pressure of about 450 psig to about 800 psig.

24. A method as recited in claim 23 wherein the production rate of ethylene polymer in step (d) is about 30,000 lbs/hr to about 50,000 lbs/hr.

25. A method as recited in claim 19 wherein said steel has a thermal conductivity of at least about 20 Btu/(hr)(°F.)(ft) and a minimum tensile strength of at least about 50,000 psi.

26. A method as recited in claim 25 wherein said steel is selected from the group consisting of A516 Gr 70, A537 Cl 2, A202 Gr B, A285 Gr C, A514 Gr B, A515 Gr 70, A517 Gr A, A517 Gr B, A533 Ty A Cl 3, A542 Ty A Cl 2 and A678 Gr C.

27. A method as recited in claim 25 wherein said steel has a thermal conductivity of about 25 to about 30 Btu/(hr)(°F.)(ft) and a minimum tensile strength of about 60,000 to about 90,000 psi.

28. A method as recited in claim 27 wherein said steel comprises less than about 0.25 weight percent chromium and less than about 0.25 weight percent nickel.

29. A method as recited in claim 28 wherein said steel is A516 Gr 70.

30. A method as recited in claim 29 wherein said at least one pipe has an outside diameter of about 10 inches to about 30 inches.

31. A method as recited in claim 30 wherein said rolled plate of said at least one pipe has a nominal wall thickness of about ½ inch to about ¾ inch.

32. A method as recited in claim 31 wherein there is further provided at least one pipe generally coaxially positioned with respect to and surrounding said at least one pipe of said conduit means so as to define a generally annular space therebetween, and wherein in step (e) said coolant fluid is passed through said annular space so as to flow around and in contact with the exterior surface of said at least one pipe of said conduit means.

33. A method as recited in claim 32 wherein said at least one pipe of said conduit means is generally vertically oriented so that flow of contents therein is in a generally vertical direction.

* * * * *